Sept. 20, 1971  H. M. ALLENBAUGH  3,606,444
AIR SCOOP MEANS FOR AUTOMOTIVE VEHICLES
Filed Sept. 4, 1969
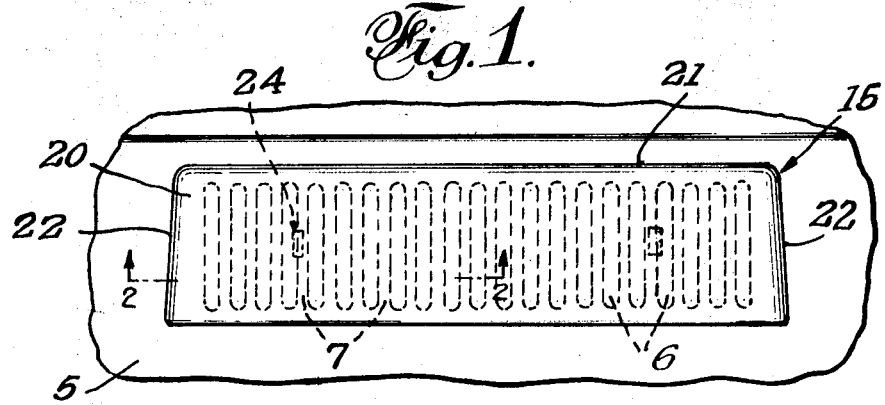
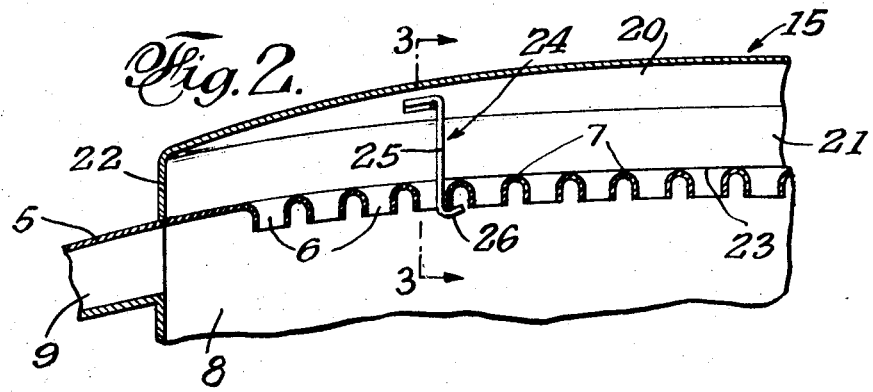
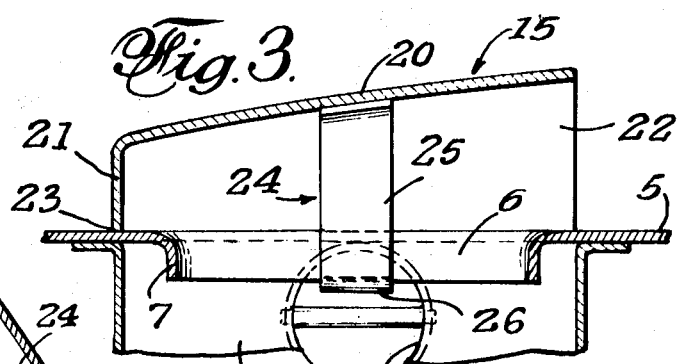
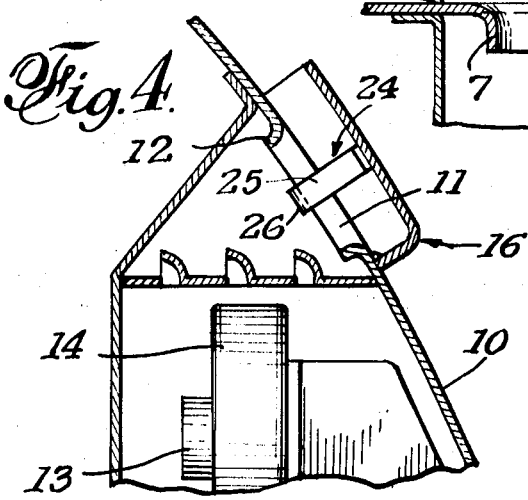
INVENTOR.
HOWARD M. ALLENBAUGH
BY
*Hyman Jackman*
ATTORNEY United States Patent Office 3,606,444
Patented Sept. 20, 1971

3,606,444
AIR SCOOP MEANS FOR AUTOMOTIVE VEHICLES
Howard M. Allenbaugh, Los Angeles, Calif., assignor to Louis Martin Majera, Norwalk, and Charles R. Goebel, Glendale, Calif., fractional part interest to each
Filed Sept. 4, 1969, Ser. No. 855,098
Int. Cl. B60h 1/30
U.S. Cl. 296—1S                                              1 Claim

ABSTRACT OF THE DISCLOSURE

A snap-retention air scoop means operatively associated with either the ventilating system, or induction of air to service the engine of an automotive vehicle, or both.

BACKGROUND OF THE INVENTION

Field of the invention

For use on the front hood, as well as the rear deck, of a rear-engined automotive vehicle to control air flow into areas below said hood and deck.

Description of the prior art

The known pertinent art comprises:
Giacomini, 2,232,108, Feb. 18, 1941
Turkenkoph, 2,847,925, Aug. 19, 1958
Burback, 3,185,243, May 25, 1965

These patents show various forms of air scoops. The Turkenkoph patent discloses a snap-on shield that is held in place between a rearwardly disposed rubber strip and an overstanding metal lip. The other two patents show bolts or screws for fastening the air scoop to the vehicle. None of these patents suggests a snap-on means utilizing the louvers of the hood and/or deck as the means for holding the scoop in operative position.

SUMMARY OF THE INVENTION

The present air scoop means primarily comprises an attachment that in no way entails cutting, marking, drilling and/or tapping the hood or deck of an automobile, and utilizing only certain of the longitudinal louver fins that are provided, for removably yet firmly retaining the air scoop in operative position.

An object of the invention is to provide air scoop attachment means that may be applied and removed without the aid or the need for tool and fastener elements.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, preferred embodiments of the present invention, which are given by way of illustration or example only.

BRIEF DESCRIPTION OF THE DRAWING

In the drawing, like reference characters designate similar parts in the several views.

FIG. 1 is a plan view of a portion of the front hood of an automotive vehicle showing air scoop means according to the present invention.

FIG. 2 is an enlarged transverse sectional view taken on the line 2—2 of FIG. 1.

FIG. 3 is a further enlarged sectional view as taken on the line 3—3 of FIG. 2.

FIG. 4 is a fragmentary vertical sectional view of a modification as applied to the rear deck of an automobile.

DESCRIPTION OF THE PREFERRED EMBODIMENTS

The present air scoop means is more particularly adapted as an attachment on the front hood, as well as on the rear deck, of a rear-engine vehicle in which the hood encloses a trunk compartment and the deck encloses the engine of the vehicle.

As shown in FIGS. 1, 2 and 3, the hood 5 is provided with a plurality of slots or openings 6 that are defined by louvers 7 that, as shown, are preferably longitudinal, i.e., in the direction of the length of the vehicle.

The slots 6 enable the passage of air from the outside into a chest 8 from which, by means of lateral passages 9, it is conducted by suitable nozzles or other means (not shown) to the passenger compartment of the vehicle for the comfort of the occupants.

It is common to have the transverse form of said hood on a convex curvature, as suggested in FIG. 2, the high point thereof being located at the longitudinal center of the hood and adjacent body portions.

As illustrated in FIG. 4, the deck 10, or any other enclosure portion of the rear of the vehicle, is preferably provided with a similar plurality of slots 11 defined by louvers 12. Such slots are intended for admitting air into the engine compartment that is enclosed by said deck. The particular means for passing air to the inlet 13 of an air fan housing 14 so the same may be fed to the engine to cool the same is not shown, being no part of this invention.

It will be clear that said slots 6 and 11 comprise relatively inefficient means for supplying an ample air flow to the indicated interior portions of the vehicle, since during movement of the vehicle the air skids off the outer surfaces of the hood 5 or deck 10, as the case may be. The present air scoop means 15 for the hood, and the similar means 16 for the deck, serve to intercept the mentioned air flow and force the same through the respective slots 6 and 11 and, thereby, provide more efficient air supply for cooling both the passenger compartment and the engine.

The air scoop means 15 comprises, generally, a transversely elongated sheet metal member formed to have a top wall 20, a rear wall 21, and end walls 22. The front of said scoop member is open, as is the bottom thereof. From FIG. 2 it will be seen that the bottom edge 23 of wall 21 is formed to conform to the transverse curvature of the hood 5. Preferably, the curvature of said edge 23 is slightly greater than that of the hood so that the lower edges of the walls 22 will contact the hood when the device is being applied, and the edge 23 and the surface of the hood form a relatively thin concavo-convex space until pressure on the top wall 20 causes the scoop member to flatten until the mentioned space is completely eliminated, thereby forming a closure that prevents air leakage from the rear of the scoop.

According to the invention, the air scoop means includes means 24 which has the dual purpose of removably attaching the scoop member to the hood 5 and exerting the above-mentioned pressure, in this case by exerting a force that draws the scoop member into the mentioned conforming engagement with the hood.

The means 24 may comprise a hook 25 extending downwardly from the inner face of the top wall 20 from an intermediate portion of the scoop wall 20, and of a length to have its laterally bent lower clip end 26 adapted to enter between two louvers 7 and achieve snap-retention engagement with one of said louvers, as best seen in FIG. 2.

At least two such hooks 25 are preferred to be used, the same, as shown in FIG. 1, being spaced equally on either side of the medial center of the device and also from the end walls 22, the clip ends 26 thereof being oppositely directed.

The device is simply applied by first making certain that the two hooks 25 are spread apart so they will pass through two slots 6 in such position as to be centered on the medial line of the hood. By applying slight pressure on the top wall 20 or tapping the same to force the clip end 26 below the louvers and simultaneously springing the scoop so the edge 23 fully conforms to the curvature of the hood 5, the engagement achieved is such that, although the clips are firmly engaged with the louvers, the scoop may be moved either forwardly or rearwardly so that all of the slots 6 are similarly covered.

The above description of the form of FIGS. 1, 2 and 3 will serve for FIG. 4 also, it being clear that one or more hooks 25 with clip ends 26 may engage louvers 12 on the deck 10 in the manner described.

While the foregoing has illustrated and described what is now contemplated to be the best mode of carrying out the invention, the constructions are, of course, subject to modification without departing from the spirit and scope of the invention.

Having thus described the invention, what is claimed and desired to be secured by Letters Patent is:

1. Air scoop means for automotive vehicles which, in a portion of the body thereof, are provided with a plurality of air-passing slots defined by louvers, said scoop means comprising:

a transversely elongated scoop formed to have a top wall, a rear wall and end walls, and to be open at the front and bottom, attaching means comprising at least one hook extending from an intermediate portion of the inner face of said top wall and provided with a clip end adapted to pass through one of said slots and into snap-retention engagement with a louver defining one side of said slot, the attaching means including a second hook in spaced relation to said one hook, the two hooks being symmetrically arranged in spaced relation to each other and, respectively, to the end walls of the scoop, the clip ends of the hooks being oppositely directed, the mentioned body portion being formed to have a transverse curvature, the rear wall of the scoop being provided with a body-engaging edge that has a transverse curvature adapted to engage the transversely curved surface of said body, the respective mentioned curvatures of the scoop edge and body portion of the vehicle, when the body-engaging edges of the end walls of the scoop are in attaching position, forming a concavo-curvex space between said body portion and said curved edge of the rear wall of the scoop, and the clip ends of the hooks, when engaged with the louvers, exerting force on the scoop to flatten the same to a curvature conforming to the curvature of the body portion.

References Cited

UNITED STATES PATENTS

| 2,206,956 | 7/1940 | Hoag | 296—91 |
| 2,367,904 | 1/1945 | Ulrich | 98—2.1 |
| 2,847,925 | 8/1958 | Turkenkoph | 98—2.1 |
| 3,043,390 | 7/1962 | Lattay | 180—54A |
| 3,185,243 | 5/1965 | Burback | 180—54A |
| 3,366,027 | 1/1968 | Kelly | 98—2 |

FOREIGN PATENTS

| 749,375 | 1/1945 | Germany | 180—54A |

BENJAMIN HERSH, Primary Examiner

L. J. PAPERNER, Assistant Examiner

U.S. Cl. X.R.

98—2R; 180—54A